(12) United States Patent
Akahoshi (10) Patent No.: US 8,493,828 B2
(45) Date of Patent: Jul. 23, 2013

(54) MEDIA RECORDING/READING DEVICE AND MEDIA RECORDING/READING METHOD

(75) Inventor: Kenji Akahoshi, Yokohama (JP)

(73) Assignees: Hitachi Consumer Electronics Co., Ltd., Tokyo (JP); Hitachi-LG Data Storage, Inc., Tokyo (JP)

(*) Notice: Subject to any disclaimer, the term of this patent is extended or adjusted under 35 U.S.C. 154(b) by 0 days.

(21) Appl. No.: 13/583,083

(22) PCT Filed: May 16, 2011

(86) PCT No.: PCT/JP2011/061194
§ 371 (c)(1),
(2), (4) Date: Sep. 6, 2012

(87) PCT Pub. No.: WO2011/145559
PCT Pub. Date: Nov. 24, 2011

(65) Prior Publication Data
US 2013/0003522 A1    Jan. 3, 2013

(30) Foreign Application Priority Data

May 17, 2010  (JP) .................................. 2010-112763

(51) Int. Cl.
*G11B 7/00* (2006.01)
(52) U.S. Cl.
USPC .................................... 369/53.15; 369/53.17
(58) Field of Classification Search
USPC .............. 369/53.15, 53.17, 53.1, 275.3, 47.1, 369/53.12, 53.13, 53.24; 714/6.1
See application file for complete search history.

(56) References Cited

U.S. PATENT DOCUMENTS

| | | | |
|---|---|---|---|
| 4,875,771 A | 10/1989 | Bowley et al. | |
| 8,341,456 B2 * | 12/2012 | Park ............................... | 714/6.1 |
| 2005/0175323 A1 | 8/2005 | Hoshizawa | |
| 2006/0044979 A1 | 3/2006 | Kuraoka et al. | |
| 2007/0121447 A1 | 5/2007 | Hoshizawa et al. | |
| 2007/0121460 A1 | 5/2007 | Kwon et al. | |

FOREIGN PATENT DOCUMENTS

| | | |
|---|---|---|
| JP | 2005-222599 | 8/2005 |
| JP | 2007-149272 | 6/2007 |
| JP | 2009-517795 | 4/2009 |
| JP | 2009-245586 | 10/2009 |
| JP | 4875771 | 12/2011 |

OTHER PUBLICATIONS

DVD-RAM Technology, edited by Triceps Division, issued by Triceps Corporation, 2000.

\* cited by examiner

*Primary Examiner* — Nabil Hindi
(74) *Attorney, Agent, or Firm* — Antonelli, Terry, Stout & Kraus, LLP.

(57) ABSTRACT

Disclosed are media recording/reproducing method and device in which recording stop due to over retrials during replacement process and wasteful conversion processing in the recording/reproducing device are suppressed when a method of managing the spare area of a write-once medium by the use of an NAP is employed to manage the spare area of a rewritable medium. During format or replacement process of the medium, the NAP is so updated that defective blocks registered as unusable clusters or as usable cluster type 2 within DFL entries in the spare area are not shown.

4 Claims, 8 Drawing Sheets

| Status1 | Defective Cluster first PSN | Status2 | Replacement Cluster first PSN | |
|---|---|---|---|---|
| 0010 | 0 | 0000 | A | SPR |
| 0010 | 0 | 0000 | B | SPR |
| 0010 | 0 | 0000 | C | SPR |
| 0010 | 0 | 0000 | D | SPR |
| 0010 | 0 | 0000 | E | SPR |
| 0010 | ... | 0000 | ... | |

⇩

| Status1 | Defective Cluster first PSN | Status2 | Replacement Cluster first PSN | |
|---|---|---|---|---|
| 0000 | a | 0000 | A | RAD |
| 0000 | b | 0000 | B | RAD |
| 0000 | c | 0000 | C | RAD |
| 0000 | d | 0000 | D | RAD |
| 0010 | 0 | 0000 | E | SPR |
| 0010 | ... | 0000 | ... | |

MEDIA RECORDING/READING DEVICE AND MEDIA RECORDING/READING METHOD

INCORPORATION BY REFERENCE

The present application claims the priority of Japanese Patent Application Ser. No. 2010-112763, filed on May 17, 2010, the contents of which are incorporated herein by reference.

TECHNICAL FIELD

The present invention relates to a media recording/reproducing device and medium recording/reproducing method and, more particularly, to regulations on handling rules on a method of using spare areas during format process or replacement process of a device that makes recording and reproducing by the use of a replacement process data area on a rewritable medium used for recording of replacement process data.

BACKGROUND ART

For example, the following patent literatures 1 and 2 and the following non patent literature 1 are present as techniques associated with the present invention.

CITATION LIST

Patent Literatures

Patent Literature 1: JP-A-2009-517795
Patent Literature 2: JP-A-2009-245586

Non Patent Literature

Non Patent Literature 1: "DVD-RAM Technology", edited by Triceps Division, issued by Triceps Corporation, 2000

SUMMARY OF INVENTION

Technical Problem

A recording/reproducing device is currently available which directs laser light by the use of a semiconductor laser at an optical disc-like recording medium typified by CD-R/RW (CD Recordable/Rewritable), DVD±R/RW (DVD±Recordable/Rewritable Disc), DVD-RAM (DVD-Random Access Memory), Blu-ray Disc (trademark registered; hereinafter referred to as BD), and so on to record data. If optical disc media of the rewritable type or WORM type are scratched due to partial damage to the media, the presence of fingerprints, contamination of the media, deterioration of their recording film, or for other cause, defective areas are generated on the media. If a recording is made on such a defective area, it is highly likely that data will not be read out. A replacement process method known as Linear Replacement is available as one method of prolonging the lifetime of the disc by circumventing defects on the disc surface. In particular, data is not recorded on such defective areas but recording is made on a spare area (alternative recording area) formed on the same optical disc. This method is applied to DVD-RAMs as described in non patent literature 1, pages 29-31. This technique is also applied to BD. Clusters which are unsuccessfully recorded or clusters which have been successfully recorded but unsuccessfully verified during recording into User Data Area on a cluster-by-cluster basis are recorded in a spare area formed on the disc. Note that each cluster is equivalent to a minimum recordable block unit in the present invention. DFL entries indicating address information about a detected defective cluster, address information about the cluster recorded in the spare area, and the type of the defect are registered as a defect list (DFL) in a management area formed on the disc. Plural types of DFL entries are defined and include SPR (Spare) entry, RAD (Re-Allocated Defect) entry, CRD (Contiguous Re-allocated Defect) entry, PBA (Possibly Bad Area) entry, NRD (Non-Re-Allocatable Defect) entry, and Unusable entry. This is also described in patent literature 1. On a WORM medium, a spare area once recorded cannot be rewritten. Therefore, the address of the leading block in a spare area to be recorded next is recorded in the management information area within the medium. Replacement process is performed while making write-once recording from this address. This is also described in patent literature 2. On the other hand, on a rewritable medium, the spare area can be reused if a recording has been made in the spare area. Therefore, "leading block address indicating next usage within the spare area" which is used on a WORM medium is not used but "clusters within a spare area capable of being used next are types of DFL entries" is used and a decision is made. Furthermore, the DFL is sorted to manage clusters within a spare area to be used next. This is described in patent literature 2. In addition, a rewritable medium can be again physically formatted (hereinafter referred to as format processing). Where a medium having a used spare area is again formatted, DFL entries already registered in a spare area are differently handled according to various cases during format processing. They are Quick ReFormat for converting all DFL entries registered as defects into "DFL entries indicating that they were defective clusters in the past" (for example, SPR with status $2=0100$, PBA with status $2=0100$, and so forth), No Certification that formats all used DFL entries, Full Certification that checks the states of all clusters within a medium and, if necessary, performs a DFL entry conversion, and Quick Certification that checks the states of clusters of only defective DFL entries within a medium and, if necessary, performs a DFL entry conversion.

However, where the method of managing clusters within a spare area capable of being used next on a rewritable medium is varied from the "method relying on the types of DFL entries" to the "method relying on a leading block address to be used next within a spare area" used in WORM media, there is no mention of any method of handling the address of this leading block such as a leading block address to be shown after format processing or a method of updating the leading block address during recording.

On a rewritable medium where a leading block to be used next within a spare area is managed by indicating the address of the leading block, the initial value of the leading block address after first format processing in the medium not yet formatted should indicate the leading block address in the spare area. Then, if user data is recorded while performing replacement process of the medium, the leading block address will be updated according to the usage state of the spare area. A case in which the medium in an already recorded state is again formatted is now considered.

Plural types of format processing of BD are defined. Also, there are plural conversion patterns for DFL entries before and after format process. If there are successive defective clusters from the first position of a spare area or there are defective clusters in a restricted range, and if the leading block address indicates the leading address of those defective blocks, then it follows that NAP does not indicate the address at which a next recording is made at variance with its name.

As a result, there arises the problem that recording of defective blocks is retried repeatedly and the retry limit is exceeded, thus stopping the recording. Alternatively, wasteful conversion processing within the recording/reproducing device is performed.

Accordingly, the present invention is intended to solve these problems. It is an object of the invention to suppress both stoppage of recording when a retry limit is exceeded and wasteful conversion processing within a recording/reproducing device by taking notice of the method of formatting the leading block address during format processing and the update method during replacement process.

Solution to Problem

The foregoing object is achieved as one example by the invention set forth in the claims.

Advantageous Effects of Invention

According to the present invention, it is possible to achieve appropriate recording operation and to improve user's convenience.

Other objects, features, and advantages of the present invention will become apparent from the following description of embodiments of the present invention provided in relation to the accompanying drawings.

DESCRIPTION OF EMBODIMENTS

Embodiments of the present invention are hereinafter described with reference to drawings.

Embodiment 1

Embodiments of the present invention are hereinafter described with reference to drawings.

Figure 1:
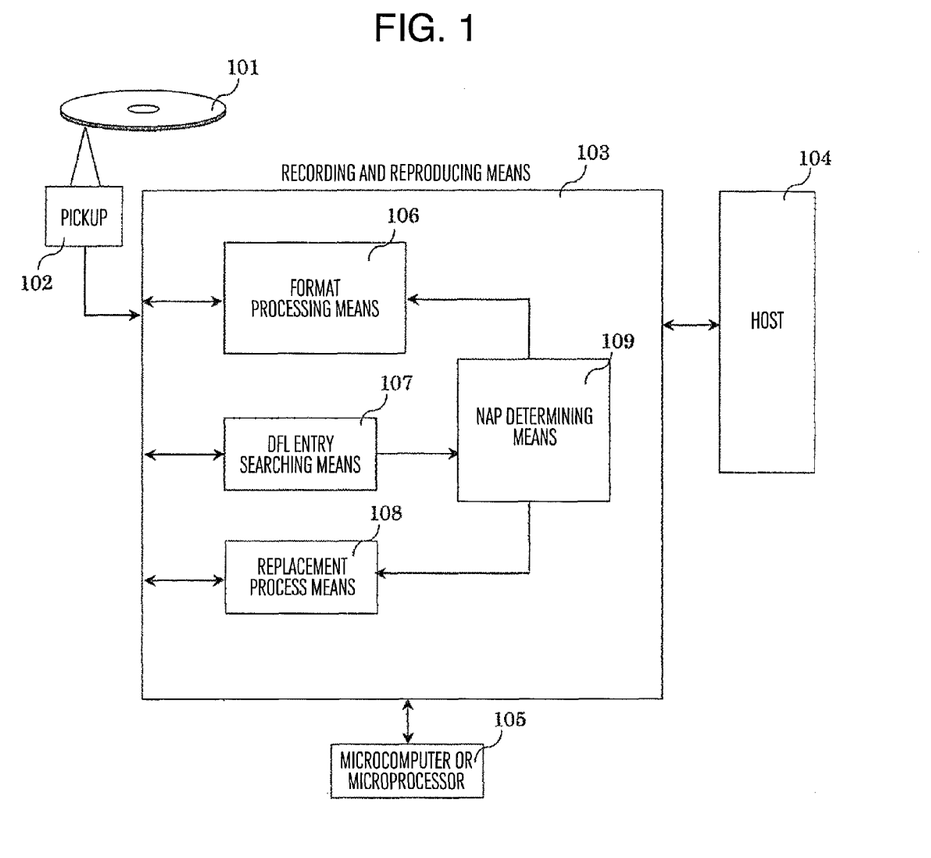
FIG. 1 is a block diagram showing the configuration of a recording/reproducing device associated with a first embodiment of the present invention.

FIG. 1 is a block diagram showing the configuration of a recording/reproducing device associated with a first embodiment of the present invention. Its description is provided below with reference to the drawing.

Shown in the figure is an optical disc 101 capable of recording and reproducing data. The disc has an area for recording of user data, an area for recording of disc management information, and an area for recording of replacement process data. A pickup 102 reproduces recorded signals from the optical disc 101. A data recording and reproducing means 103 has every means (not shown) needed to output data reproduced from the pickup to a host 104 being an external device or to record data from the host 104 on the disc, such as servo control unit for controlling the pickup 102, a unit for modulating and demodulating data, a unit for making error corrections, temporary storage means for temporarily storing data, temporary storage means control means for controlling the temporary storage means, and host I/F means for making exchanges with the host 104 in accordance with protocols (typified by ATAPI (AT Attachment Packet Interface)). A microcomputer or microprocessor 105 controls the data recording/reproducing means. A format processing means 106 physically formats the disc 101. A DFL entry searching means 107 can search for DFL entries recorded in the management information area of the disc 101, the DFL entries indicating how clusters have been replaced in user data recording area and in spare area. A replacement process means 108 records alternative clusters in the spare area (i.e., performs so-called replacement process) when it is determined that there are defective clusters during recording and/or reproducing to or from the user data recording area on the disc 101. A NAP determining means 109 determines the leading block address of a cluster to be recorded next in the spare area, i.e., NAP (Next Available PSN). The leading block address of a cluster to be recorded next in the spare area will be hereinafter referred to as the NAP. It is assumed that this NAP exists in each spare area. In the present embodiment, for the sake of convenience, ISA0 that is one of the spare areas is noticed. It is assumed that the above-described NAP refers to the NAP within the ISA0. There is no problem if the first-mentioned NAP is the NAP in any spare area.

Figure 2:
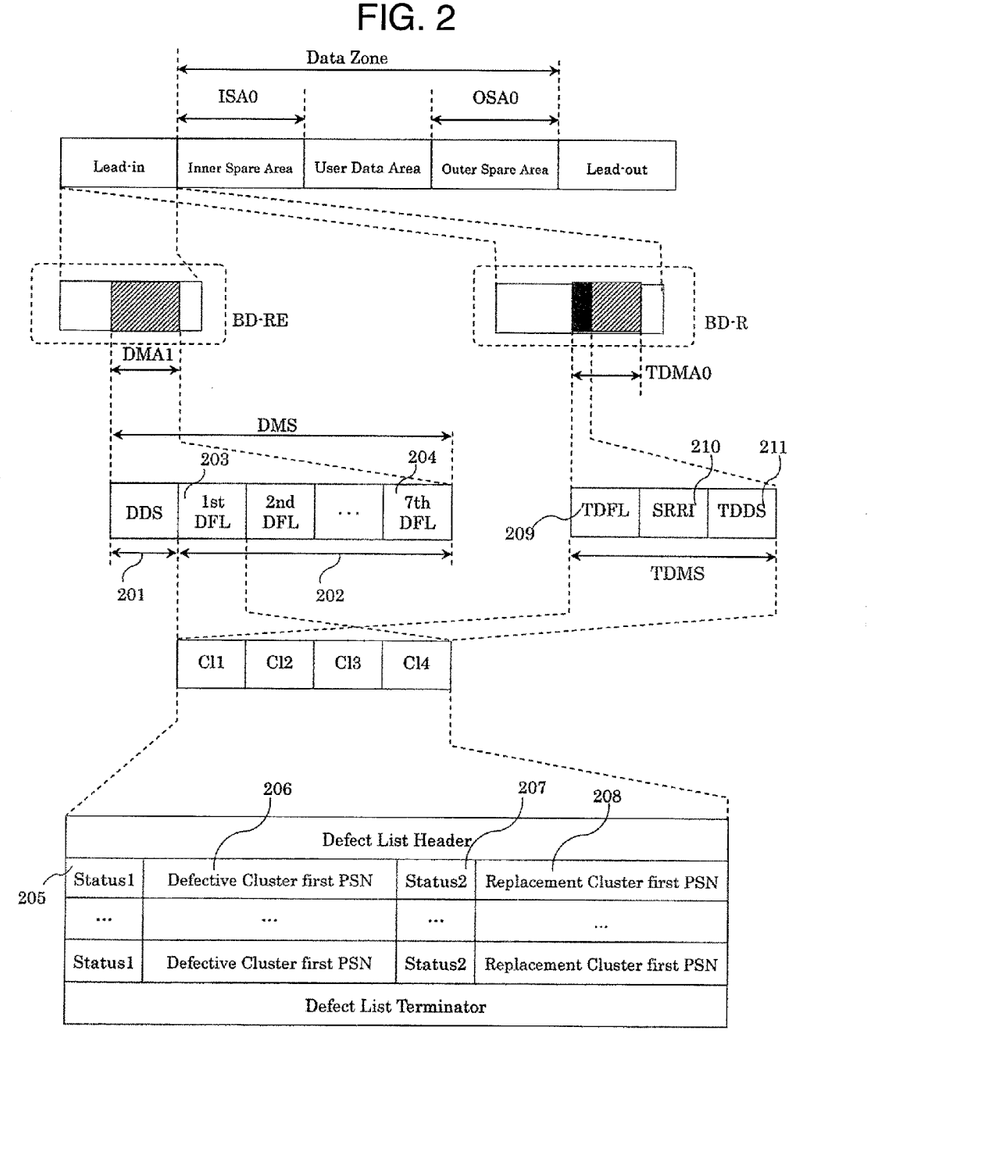
FIG. 2 is a view showing the structure of a whole BD-RE/R disc.

FIG. 2 is a view showing the whole structure of a disc of BD-RE/R SL (single layer). Each of BD-RE and BD-R is roughly composed of three major portions: Lead-in zone, Data Zone, and Lead-out zone. Furthermore, the Data Zone is configured including ISA0 (Inner Spare Area 0) area that is an inner spare area, User Data Areas, and OSA0 (Outer Spare Area 0) that is an outer spare area. On BD-RE, DMAs (Disc Management Areas) for recording management information about the state of recording are present in the Lead-in zone and Lead-out zone. DMA1-4 are defined on BD-RE SL. In this example, for the sake of simplicity of illustration, only DMA1 is described. On BD-R, the state of recording of the disc is managed with a TDMA (Temporary Disc Management Area) until the disc is finalized. The TDMA can exist in the Lead-in zone, ISA0 area, and OSA0 area, in which case the TDMA forms TDMA0, TDMA1, and TDMA2, respectively. In this example, for simplicity of illustration, TDMA1 and TDMA2 contained in ISA0 and OSA0 are omitted. After finalization, information is recorded in DMA in the same way as for BD-RE. First, the DMA area of BD-RE is described.

The DMA area is composed of DMS (Disc Management Structure). The DMS is composed of DDS (Disc Definition Structure) 201 and DFL (Temporary Defect List) 202. The DDS contains DFL arrangement information and disc management information (such as the capacities of ISA0 and OSA0). The DFL is chiefly used as a list for managing spare locations for defective locations on the disc.

The DFLs are now described further. DFLs of BD-RE SL are composed of from DFL at the first position indicated by 203 to DFL at the seventh position indicated by 204. Among them, only one position is valid in practice. At the beginning of a recording, the use is started from 203. Overwriting is done plural or many times. When recording into the corresponding block is not successfully made and a verification gives negative results, the valid position is shifted to the DFL in the second position. Accordingly, if the DFLs are used up to the DFL in the seventh position, DFL registration can no longer be performed. Any recording involving a replacement recording is impossible to make. However, in some cases, DFL registration is disabled even if all the DFLs including the DFL in the seventh position are not used up and thus any recording involving a replacement recording is impossible to make. This case is described below. One position is composed of four clusters as shown. A DFL registration is performed using 1 to 4 clusters.

Each DFL is stored such that it is sandwiched between Defect List Header and Defect List Terminator. A format in which a DFL registration is performed is composed of Defective Cluster first PSN indicating a Status 1 area 205 and a replacement source address 206 and Replacement Cluster first PSN indicating a Status 2 area 207 and a replacement target address 208. Status 1 and Status 2 cooperate to indicate the type of each DFL entry. On BD-RE, during first format processing of the medium, all the spare areas are secured as SPR (spare) entries (with Status 2=0000b). This indicates that these spare areas can be used as replacement areas. For example, where clusters are replaced one at a time during recording, Status 1 and Status 2 assume a value of 0000b (in binary representation), indicating a RAD. Indicated by 206 is the leading block address of a defective cluster. Indicated by 208 is the leading block address of a replacement target cluster. A DFL list composed of these 205-208 is sorted. Where a DFL is composed of a RAD and an SPR, the RAD and SPR are arrayed in this order. Where the recording/reproducing device performs next replacement process, it is possible to quickly search for usable and valid clusters registered as SPR entries by searching for the sorted DFL list.

The TDMA of BD-R is next described. The TDMA area is composed of plural TDMS (Temporary Disc Management Structure) areas. One TDMS is updated or recorded at a time. Each TDMS is composed of TDFL (Temporary Defect List) 209, SRRI (Sequential Recording Range Information) 210, and TDDS (Temporary Disc Definition Structure) 211. The TDFL 209 is chiefly used as a list for managing spare locations for defective locations on the disc. The TDFL 209 is identical in structure with the DFL of BD-RE and composed of a DFL list consisting of 205-208. The SRRI 210 mainly contains management information about recording areas corresponding to CD tracks and is known as SRR (Sequential Recording Range). Furthermore, the TDDS 211 contains TDFL arrangement information and disc management information (such as the capacities of ISA0 and OSA0). NAPs in ISA0 and OSA0 are given by P_ISA0 (Next Available PSN of ISA0) and P_OAS0 (Next Available PSN of OSA0) and contains these pieces of information.

Figure 3A:
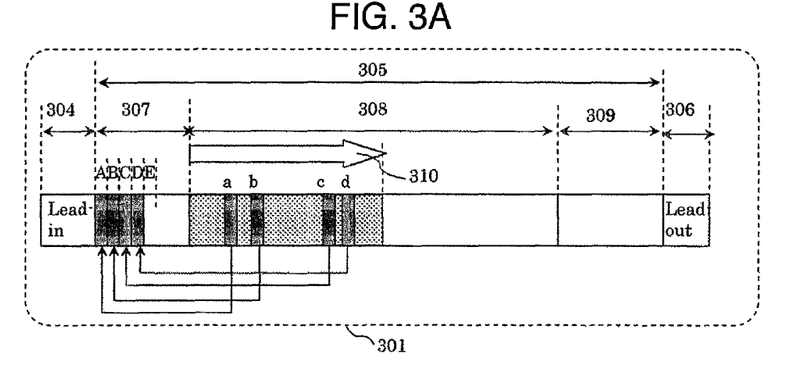
FIG. 3A is a view for illustrating a method of processing defects on BD-RE/R.
Figure 3B:
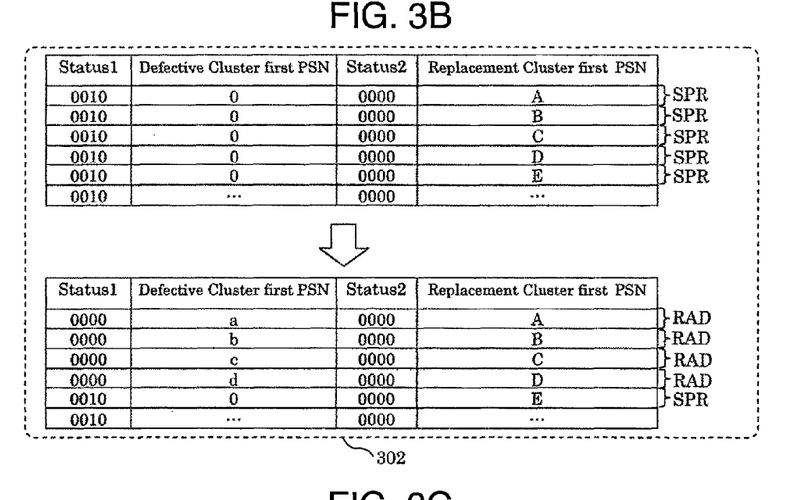
FIG. 3B is another view for illustrating a method of processing defects on BD-RE/R.
Figure 3C:
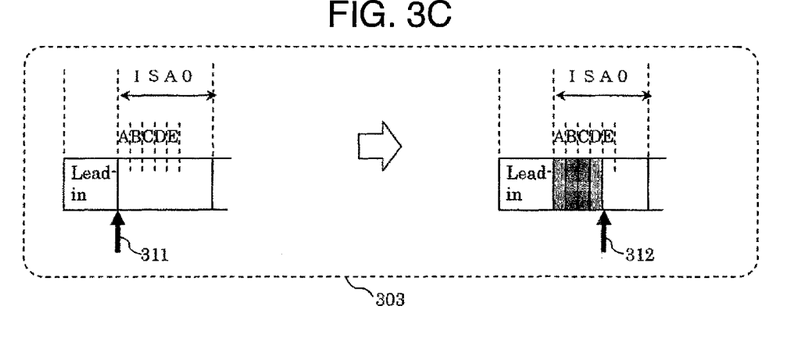
FIG. 3C is a further view for illustrating a method of processing defects on BD-RE/R.

A method of using spare areas of BD-RE/R is next described by referring to FIGS. 3A, 3B, and 3C. First, a method of using the spare areas of BD-RE is described by referring to 301 of FIGS. 3A and 302 of FIG. 3B.

Indicated by 301 is a view of a disc formatted so as to secure the spare areas of ISA0 and OSA0, and in which replacement process is performed during recording into User Data Area 308. As described in connection with FIG. 2, the disc is composed of a Lead-in zone 304, a Data zone 305, and a Lead-out zone 306. The ISA0 (307) is secured on the disc inner side of the Data zone 305. The OSA0 (309) is secured on the disc outer side. These areas are used as spare areas for defects found during data recording. 301 shows an example in which defective clusters a, b, c, and d are found when a recording is made into the User Data Area 308 in the sense of the arrow 310 of FIG. 3A and in which replacement process with RAD entries of A, B, C, and D, respectively, is performed in ISA0 of the spare area 307. How the DFL varies at this time is described using 302. The top view of 302 indicates DFL immediately after format processing. As already described in connection with FIG. 2, on BD-RE, all spare areas are registered as SP entries during the first format processing. Therefore, A, B, C, D, E, and so forth are regarded as usable clusters and registered as SPR entries in turn from A that is the leading block address of ISA0. Where A, B, C, and D are used as spare targets for a, b, c, and d, respectively, DFL is as in the bottom view of 302. It is seen that Status 1 has been modified to a RAD entry and that a cluster within ISA0 to be used next has been modified to E.

A method of using the spare areas of BD-R is next described by referring to 301 of FIGS. 3A and 303 of FIG. 3C. With respect to the state of an assumed replacement process, the state of 301 is assumed in the same way as for BD-RE. The difference with BD-RE is described with reference to 303. Unlike BD-RE, on BD-R, SPR entries are not registered during format processing. Spare areas to be used next are managed with NAP. This address exists in each spare area. In the case of 301, two NAPs exist for ISA0 and OSA0, respectively. This number increases according to the number of spare areas. When the spare areas are not yet used immediately after format processing, the leading block address that can be used next within the spare area ISA0 indicates the leading block address 311 of cluster A. When all the replacement process for a, b, c, and d ends, the leading block address 312 of cluster E is shown. This shows that the cluster within the ISA0 to be used next is E. In this way, it is seen that the method of managing addresses within the spare area to be used next differs between BD-RE and BD-R.

Figure 4:
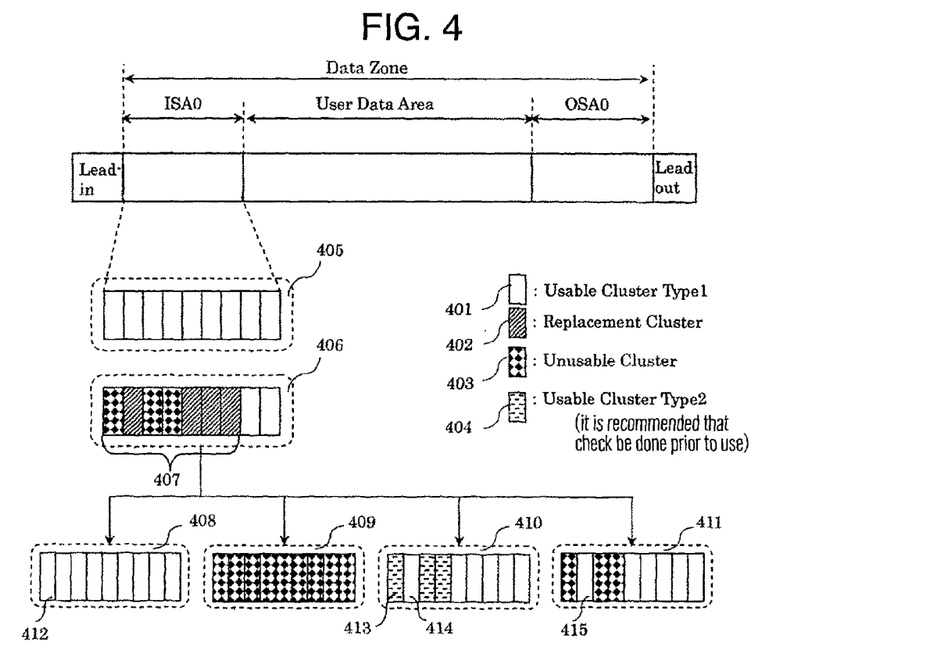
FIG. 4 is a view for illustrating processing for reformatting BD-RE that has been already formatted.

A case in which the method of managing addresses within spare areas owing to NAP adopted on BD-R is applied to BD-RE is now considered. Problems with the method of using spare data areas at this time are described by referring to FIG. 4. FIG. 4 is a view illustrating variations of DFL entries of spare areas during format processing on BD-RE. The format processing includes physical formatting and certification for checking the state of the medium as well as updating defect information about the medium based on the result of the check. FIG. 4 shows a BD-RE SL disc. The definitions of the areas are the same as already described. Explanatory notes 401-403 show the states of clusters in spare areas. The note 401 is Usable Cluster Type 1 (e.g., SPR entry with Status 2=0000b) indicating usability. The note 402 is a replacement cluster (e.g., RAD entry with Status 2=0000b) indicating that replacement data is recorded in practice during replacement process. The note 403 is a defective cluster and so is an unusable cluster that is highly likely to be unusable. The note 404 is Usable Cluster Type 2 (e.g., SPR entry with Status 2=0100b) indicating that the cluster has a high possibility that it was a defective cluster in the past and, therefore, it should be checked after recording if it is used.

Indicated by 405 is the status of ISA0 immediately after performing format processing of a BD-RE medium on which no recording is made at all. All the clusters are of Usable Cluster Type 1, indicating that there is a high possibility that all the clusters can be used.

The great difference in format processing between BD-RE and BD-R is now described. Since BD-R is a WORM medium, format processing is performed only once for one medium. Accordingly, it is unlikely that the NAP within spare areas will return from the currently shown value. However, BD-RE is a rewritable medium and so the medium can be reused, i.e., can be reformatted. Furthermore, there are plural methods of formatting BD-RE according to different methods of converting DFL entries. Especially, various combinations of methods of DFL conversion can be assumed. Therefore, four cases are assumed as an example. State 406 is obtained after replacement process or format processing and shows clusters having DFL entries configured as in 407. In this case, the clusters are composed of replacement clusters and unusable clusters. It is considered that a medium having spare areas under these DFL entry states is formatted. In example 408, all clusters are converted into usable cluster type 1 irrespective of whether each cluster is a replacement cluster or an unusable cluster. In this case, a cluster within the spare area on which next recording is made is 412.

In example 409, all clusters within the spare areas are regarded as unusable clusters as a result of full certification of the spare areas. In this case, clusters within the spare areas which have a high possibility that next recording can be made on the clusters do not exist within ISA0 and so an ISA0 full flag indicating that the ISA0 is in full use is set, denoting that the clusters are unusable. In example 409, even if unusable clusters are of unusable cluster type 2, exactly the same explanation as the foregoing is possible.

In example 410, clusters which were unusable clusters in 406 are converted into the usable cluster type 2 and other clusters denoted as replacement clusters are converted into usable cluster type 1. In this case, a cluster within a spare area on which next recording is made is cluster 414 first registered as usable cluster type 1. 413 that is registered as usable cluster type 2 may be used as a spare area on which next recording is made. However, there is the possibility that it might be a defective cluster in the past and thus unusable for recording. Therefore, it is necessary to check it after usage. In example 411, clusters that were unusable clusters in 406 are left intact and the other clusters designated as replacement clusters are converted into usable cluster type 1. In this case, a cluster within a spare area on which next recording is made is 415.

Note that these four examples are merely examples. Conversions of other combinations are also conceivable according to the specifications of the recording/reproducing device. As described so far, where a medium including spare areas for DFL entry states as in 406 are again formatted, existing DFL entry conversions produce various results.

In a case where the method of managing spare areas using NAP of BD-R is introduced to BD-RE, at what position the NAP is set under the conditions 408-411 is now considered. When the NAP indicating usable clusters within the spare areas is introduced, it is assumed that "SPR entry with Status 2=00000b indicating a usable cluster" used in the prior art BD-RE is abolished. As described just now, under conditions as indicated by 408-411, clusters on which next recording is made are different, i.e., 412-415. Therefore, if the specifications of the NAP adopted during format processing of BD-R, i.e., "specifications that return the value to the value at the leading position of the spare areas", are used, problems will take place.

Figure 5A:
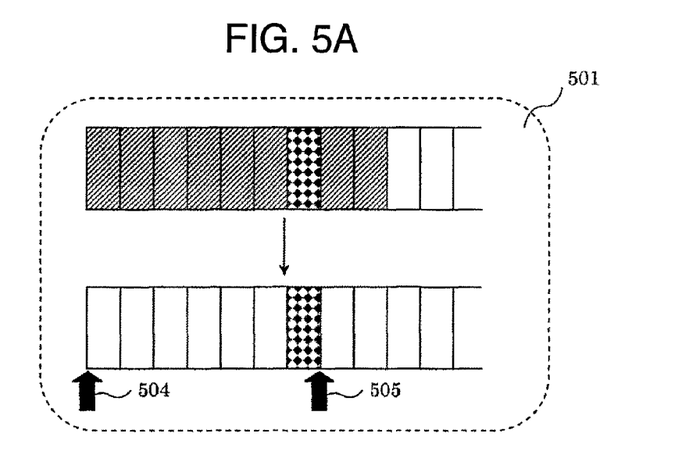
FIG. 5A is an example of NAP arrangement after format processing for solving the problem.
Figure 5B:
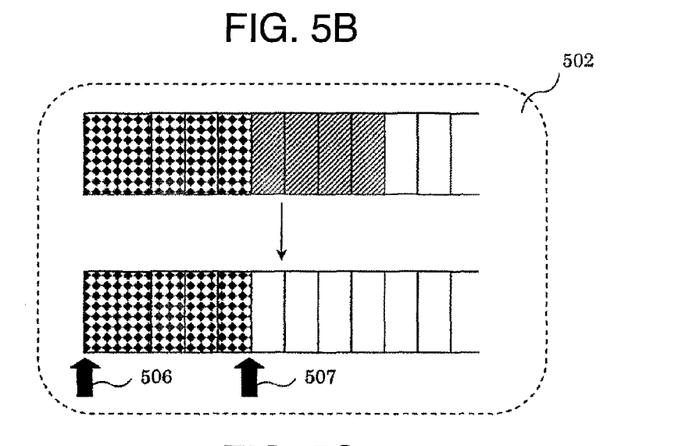
FIG. 5B is another example of NAP arrangement after format processing for solving the problem.
Figure 5C:
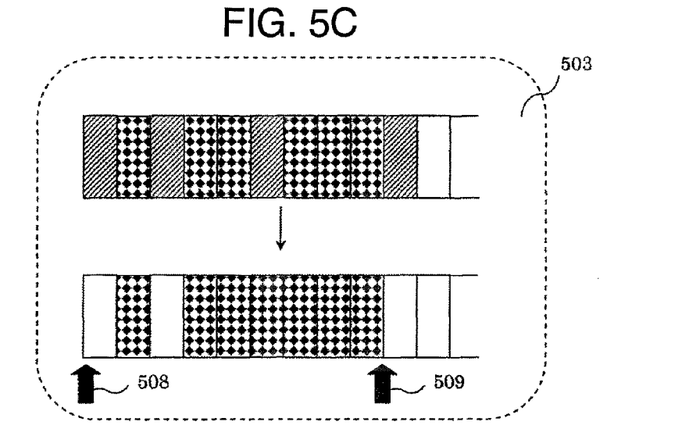
FIG. 5C is a further example of NAP arrangement after format processing for solving the problem.

This is described by referring to FIGS. 5A, 5B, and 5C. The relationship between the top and bottom figures of the figures within 501-503 of FIGS. 5A-5C exists before and after format processing. The top view indicates the state assumed prior to format processing. The bottom view indicates the state assumed after format processing. The hatched explanatory notes used in the figures are the same as those of FIG. 4. In example 501, only clusters designated as unusable clusters are left after format processing and the other clusters are converted into usable cluster type 1. A case in which the NAP is initialized, i.e., returned to position 504 by format processing in the same way as for BD-R is now considered. If replacement process proceeds, the NAP proceeds from the position 504, reaches the first position of clusters registered as unusable clusters, and no recording can be made on these clusters registered as unusable clusters, then the NAP can be advanced into the position 505 if recording retry processing is possible. Alternatively, the recording/reproducing device can make such recordings that unusable clusters are avoided because the device previously grasps those clusters by searching the DFL for clusters registered as unusable clusters. In the figure, if the NAP coincides with the leading block address of the unusable clusters, then the NAP should be modified to the position 505. Accordingly, if unusable clusters exist behind the NAP, there is no problem. Therefore, the NAP is made to indicate the first position of initially usable clusters within the spare areas. Furthermore, if the unusable clusters are of the usable cluster type 2 in the bottom view of 501, exactly the same explanation applies as the foregoing. The NAP is at 504.

State 502 is next considered. In the case of the state 502, there are successive clusters from the cluster including the leading one, the successive clusters being registered as unusable clusters. It is now considered that the NAP is initialized by format processing in the same as for BD-R, i.e., returned to the position 506. In the example 502, there are five successive clusters which are registered as unusable clusters. It is assumed, for example, that the limit number of retry recordings made within the spare areas of the recording/reproducing device while varying the recording position is three. A recording/reproducing device that retries recordings even on clusters registered as unusable clusters is now considered.

Assuming that all the clusters registered as unusable clusters in the bottom view of 502 are unrecordable clusters, the number of successive defective clusters exceeds the recording retry limit before reaching the first cluster 507 on which a first recording can be made as viewed from the front end of the spare areas and so the retry limit is exceeded. The recording is stopped, because the NAP is returned to 506 during reformat processing. On the other hand, a recording/reproducing device that does not make a recording on clusters which are registered as unusable clusters is considered. Since the NAP is indicated by 506, it is necessary to make recordings after changing the NAP from the position 506 to 507 within the recording/reproducing device so as to avoid unusable clusters. If the position 506 of the NAP shown at first is left intact, then no recording can be made. Therefore, if there are successive unusable clusters (at least one cluster) including the first cluster in the spare areas in this way, the NAP is initialized at the position 507. Thus, replacement process can be performed without performing wasteful recording retrials. In addition, if some or all of the unusable clusters in the bottom view of 502 are of the usable cluster type 2, exactly the same explanation as the foregoing applies. The NAP is at 507. Furthermore, where all the clusters within the spare areas are treated as unusable clusters or usable cluster type 2 as in the example 409 in FIG. 4, it follows that recordable clusters within the spare areas do not exist in the ISA0 and so the NAP shows a value (for example, FF FF FF FFh) indicating that values of clusters within the spare area on which next recording should be made are invalid.

The state 503 is next considered. In the state 503, clusters registered as unusable clusters are arranged into plural groups. In the case of this state, the same concept as in the case of 502 can be applied. The NAP is initialized at the position 508 that is the initially usable cluster. Additionally, in a case where some or all of the unusable clusters in the bottom view of 503 are of the usable cluster type 2, exactly the same explanation as the foregoing applies. The NAP is at 509.

As described so far, when a medium that has been already formatted is again formatted, the state of DFL entry registration prior to format processing is noticed. The NAP is so determined that clusters as registered as unusable clusters or as usable cluster type 2 are not shown. Thus, replacement process can be performed without performing wasteful retrials.

Figure 6A:
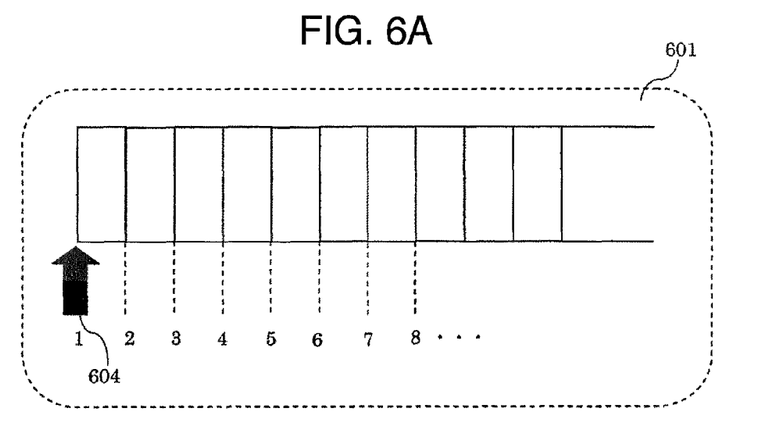
FIG. 6A is an example of method of updating an NAP after format processing.
Figure 6B:
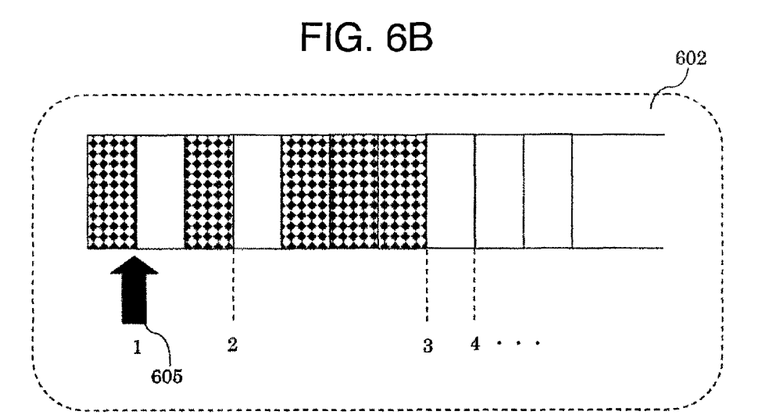
FIG. 6B is another example of method of updating an NAP after format processing.
Figure 6C:
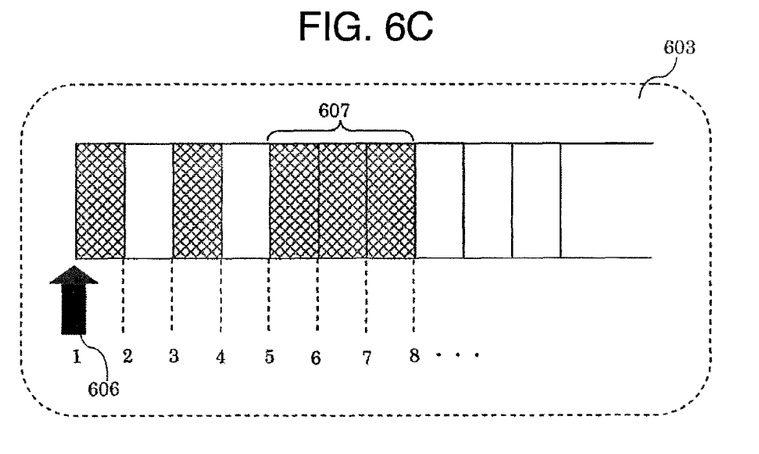
FIG. 6C is a further example of method of updating an NAP after format processing.

How the NAP should be updated when recording processing including replacement process is performed on a medium having spare areas including unusable clusters or usable cluster type 2 is next described by referring to FIGS. 6A, 6B, and 6C. A medium 601 in FIG. 6A has spare areas in which there are no defective clusters at all. Where each one block of replacement data is recorded at a time during replacement process, the NAP is incremented by 1 block from the position 604 as given by numbers shown in the figure (1, 2, 3, 4, 5, 6, 7, 8, and so forth).

In case 602 of FIG. 6B, spare areas include unusable clusters. In this case, the NAP should be updated from the position 605 as given by the number sequence (1, 2, 3, 4, and so forth) shown in the figure so as to avoid unusable clusters. That is, the NAP is so updated that only blocks that are usable within the spare areas are shown. Where some or all of unusable clusters at 602 are of the usable cluster type 2, exactly the same explanation as the foregoing applies.

On a medium 603 of FIG. 6C, unusable clusters or usable cluster type 2 as indicated by 602 is registered prior to format processing. A format method of clearing unusable clusters and usable cluster type 2 is selected. Actual defective blocks exist but the medium has no defective clusters at all in the spare areas in managing the DFL (in the same state as the medium 601). Under this condition, there arises a problem in the following case. It is assumed that the recording retry number for the recording/reproducing device in the spare areas has an upper limit, e.g., two. Since this medium is treated as a medium having no defective clusters, the NAP is initialized at position 606 in the same way as in the example 601. Where each one block of replacement data is recorded as a time during replacement process, the NAP is updated while being incremented by one. An area 607 is a usable area for DFL entries. In practice, however, it is highly likely that this area contained unusable clusters or clusters of the usable cluster type 2 in the past, i.e., the area is a defective or probably defective area. The recording/reproducing device has a high possibility that it cannot make recording on this area in practice. Under circumstances where defect information has been deleted, the only one method of updating the NAP during recording retry processing is to increment the NAP to an adjacent block in the same way as in 601.

In the area 607, there are successive deflective blocks and, therefore, if the recording retry limit is exceeded, no recording can be made. There is a high possibility that the replacement process will result in failure, thus stopping the recording. Accordingly, where a medium is formatted as in 602, it is possible to make a recording into a position indicated by 8 beyond the area of 607 by means of recording retry processing by storing a maximum number of successive blocks of unusable clusters or clusters of the usable cluster type 2 prior to format processing and setting the number of recording retrials in the spare areas to equal to or greater than the maximum number of blocks. Of course, the set number has an upper limit depending on recording/reproducing device. It is necessary to set the number in such a way that the upper limit is not exceeded.

As described so far, in a case where recordings are made on a medium having spare areas including unusable clusters or clusters of the usable cluster type 2, DFL entry registration is noticed. Replacement process can be performed without performing wasteful retrials by updating the NAP in such a way that clusters registered as unusable clusters or as the usable cluster type 2 are not shown. Furthermore, stoppage of recording on a certain disc due to an excess of recording retrials can be suppressed by grasping the maximum number of successive blocks registered as unusable clusters or as usable cluster type 2 prior to format processing and modifying the recording retry number within the spare areas to within a given limit value for the recording/reproducing device such that the recording retry limit is not exceeded.

Figure 7A:
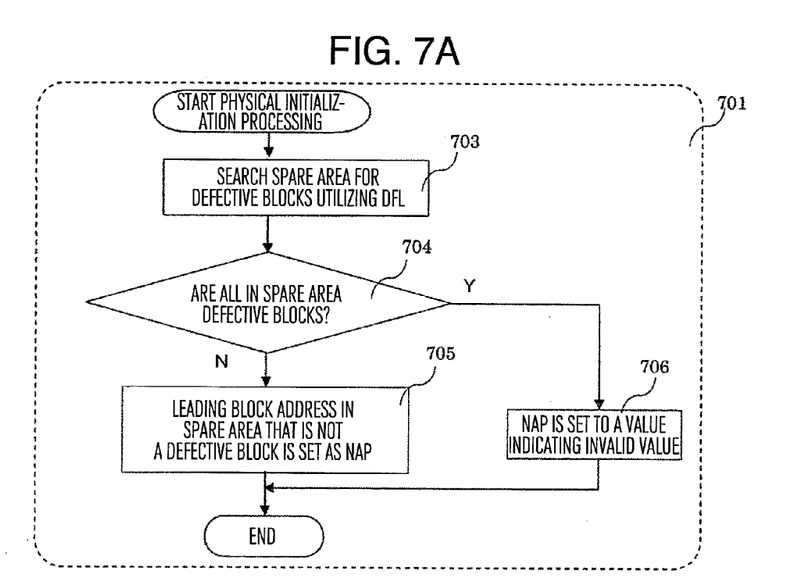
FIG. 7A is a flowchart of an example of determination of an NAP during format processing and during replacement process.
Figure 7B:
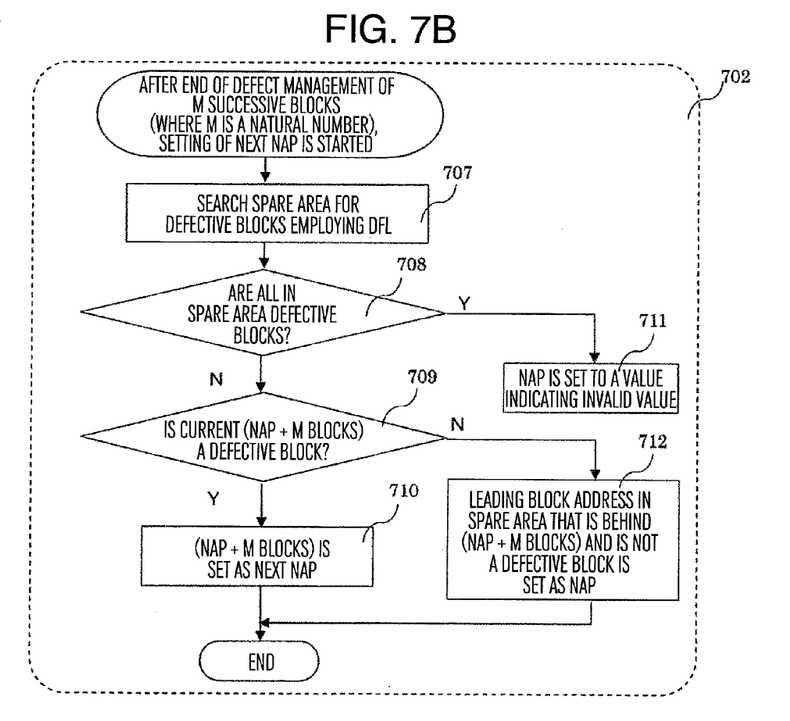
FIG. 7B is another flowchart of an example of determination of an NAP during format processing and during replacement process.

Finally, one example of flowchart in the present embodiment is described by referring to FIGS. 7A and 7B.

Indicated by 701 in FIG. 7A is one example of flowchart of a method of determining the NAP when a medium is initialized. First, the spare areas are searched for defective block information utilizing the DFL (703). If the search is already complete, then it is not necessary to make such a search. When wording in the present embodiment is used, blocks registered as unusable clusters or as unusable cluster type 2 correspond to defective blocks. As a result of a search, a decision is made as to whether all blocks within the spare areas are defective blocks (704). If the decision is YES, a value that is invalid as a block address is set as an NAP (706). In the present embodiment, this corresponds to FFFFFFFFh. If the decision is NO, the leading block address of the first block that is not a defective block within the spare areas is set as an NAP (705).

Because of the flow described so far, the value of the NAP during format of a medium can be determined.

In FIG. 7B, 702 is one example of flowchart of a method of determining the NAP during replacement process when data is being recorded on a medium.

In this flow, M (where M is a natural number) successive blocks of replacement data are recorded in the spare areas by some replacement process and then an NAP to be used next is determined.

First, the spare areas are searched for defective block information utilizing the DFL. If the search is already complete, it is not necessary to make a search (707). When wording of the present embodiment is used, blocks registered as unusable clusters or as usable cluster type 2 correspond to defective blocks. Defective blocks are both unusable clusters and usable cluster type 2 or only unusable clusters, depending on specifications of the recording/reproducing device. Either type of specifications is possible. As a result of the search, a decision is made as to whether or not all the blocks in the spare areas are defective blocks (708). If the decision is YES, a value that is invalid as a block address is set as an NAP (711). In the present embodiment, this corresponds to FFFFFFFFh. If the decision is NO, a decision is made as to whether blocks obtained by adding M blocks to the current NAP are defective blocks (709). If the decision is YES, (NAP+M blocks) is set as a next NAP (710). If the decision is NO, the leading block address of the first block within the spare areas which is not a defective block and which exists after the (NAP+M blocks) is set as an NAP (712).

Because of the flow described so far, the next valid value of the NAP during replacement process of the medium can be updated.

Figure 8:
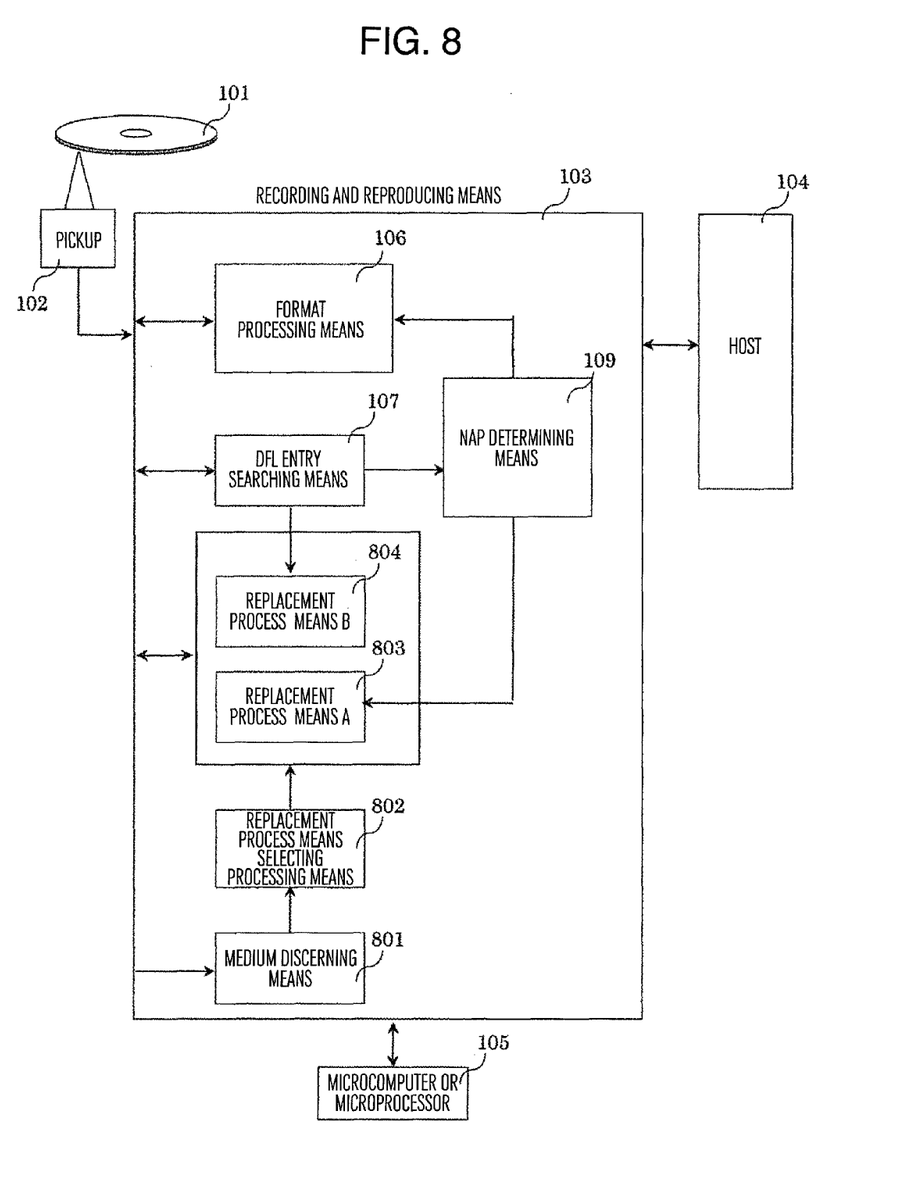
FIG. 8 is a block diagram showing the configuration of a recording/reproducing device associated with a second embodiment of the present invention.

FIG. 8 is a block diagram showing the configuration of a recording/reproducing device associated with a second embodiment of the present invention. The configuration is described below by referring to the figure.

In the figure, 101-107 and 109 are the same as their counterparts described in connection with FIG. 1. A medium discerning means 801 judges the type of a medium loaded in the recording/reproducing device. The medium discernment includes discrimination between media which are of the same type but are different in number of recording layers. A replacement process means selecting processing unit 802 can select either processing of replacement process means A of 803 or processing of replacement process means B of 804 based on the result of the discernment of the medium provided by the medium discerning means 801. For example, it is assumed that the replacement process means A is "means for managing a spare area to be used next by the NAP without registering SPR entries during format processing of the medium" of the first embodiment and the replacement process means B is "means for managing spare areas while securing all the spare areas as SPR entries (with Status 2=0000b) during format processing of the medium" of the first embodiment. Furthermore, where there are two media b and a which are processed by the replacement process means B and A, respectively, a switch is made between the processing performed by the replacement process means A and the processing performed by the replacement process means B depending on the medium a or b loaded in the recording/reproducing device. Consequently, a replacement process method best adapted for the medium can be selected.

Furthermore, in the description of the present embodiment, BD-RE SL is taken as one example of disc. Obviously, the same advantageous effects are produced whether the disc has a single layer or multiple layers.

Especially, in the case of multiple layers, the direction in which spare areas are used is different between a single layer and multiple layers or between inner and outer peripheries of layers. However, there are no special considerations to be taken into consideration. The present invention can be applied to all layers. Furthermore, the present invention is applicable to any recording medium having conceptions of areas for recording of replacement process data and areas for storing management information, as well as to optical discs described in the current embodiment. Obviously, the same advantageous effects are obtained.

The preferred embodiment of the present invention has been described so far by referring to drawings. According to the present invention, in a case where a method of managing spare areas of a WORM medium by the use of an NAP is applied to a method of managing the spare areas of a rewritable medium, the NAP is prevented from showing defective blocks by updating the NAP in such a way that blocks registered as unusable clusters or as usable cluster type 2 within the DFL entries in the spare areas are not shown during format processing of the medium or during replacement process. Replacement process can be performed without performing wasteful recording retry processing of the recording/reproducing medium or wasteful conversion processing, thus solving the problem.

It is to be understood that the present invention is not restricted to the above embodiment but embraces various modifications. For example, the above embodiment has been described in detail to illustrate the present invention in an easily understandable way. The invention is not always restricted to one having all the configurations described. Furthermore, some configurations of some embodiment can be replaced by configurations of other embodiment. In addition, configurations of other embodiment can be added to the configurations of one embodiment. Further, other configurations can be added to some configurations of each embodiment, some configurations can be deleted, or some configurations can be replaced.

Additionally, some or all of the above-described configurations can be implemented in hardware or accomplished by executing programs by means of a processor. Furthermore, control lines and information lines which are considered as necessary for explanations are shown. Always not all control lines and information lines of finished products are shown. It may be considered that almost all of the configurations are interconnected in practice.

In summary, the above description is provided as to the embodiment. The present invention is not restricted thereto. It is obvious for those skilled in the art that various changes and modifications can be made within the scope of the spirit of the invention and appended claims.

REFERENCE SIGNS LIST

101: optical disc
102: pickup
103: data recording and reproducing means
104: host
105: microcomputer or microprocessor
106: format processing means
107: DFL entry searching means
108: replacement process means
109: NAP determining means
201: DDS
202: DFL
203: 1st position of DFL
204: 7th position of DFL
205: status 1 area
206: Defective Cluster first PSN
207: Status 2 area
208: Replacement Cluster first PSN
209: TDFL
210: SRRI
211: TDDS
301: diagram for illustrating a method of using spare areas of BD
302: diagram illustrating a method of using spare areas of BD-RE
303: diagram illustrating a method of using spare areas of BD-R
304: Lead-in zone
305: Data Zone
306: Lead-out zone
307: spare areas
308: User Data Area
309: OSA0
310: recording direction 311: leading block address of cluster A
312: leading block address of cluster E
401: Usable Cluster Type 1
402: replacement cluster
403: unusable cluster
404: Usable Cluster Type 2
405: state of ISA0 immediately after format processing
406: state after replacement process or format processing
407: example of configuration of state of cluster
408: state 1 after format processing
409: state 2 after format processing
410: state 3 after format processing
411: state 4 after format processing
412-415: clusters within spare area on which next recording is made
501: variation 1 in state of DFL entry before and after format processing
502: variation 2 in state of DFL entry before and after format processing
503: variation 3 in state of DFL entry before and after format processing
504-509: NAP positions in various states
601: a case in which spare areas have no defective cluster at all
602: a case in which spare areas contain unusable cluster entries
603: a case in which unusable cluster entries existed prior to format processing but have disappeared after the processing
604-606: NAP positions
701: one example of flowchart of method of determining NAP during format processing of medium
702: one example of flowchart of method of determining NAP during replacement process while data is being recorded on medium
703-712: various processing steps in flowchart
801: medium discerning means
802: replacement process means selecting processing means
803: replacement process means A
804: replacement process means B

The invention claimed is:

1. A recording/reproducing method of performing a recording/reproducing operation by using a rewritable medium having a user data area, a spare area, and a management information storage area which stores information used by the spare area,
wherein DFL entry information indicating defect type information about each block is stored at least in the management information storage area,
wherein, if blocks in the spare area are judged as unusable as alternative blocks during future replacement process when formatting process or replacement process is performed, the first-mentioned blocks can be registered as "unusable entries" in the DFL and, if the first-mentioned blocks were judged as defective blocks in the past and might be usable for future replacement process, the first-mentioned blocks can be registered as "SPR (spare) entries with status 2=0100" in the DFL, and
wherein assuming that a leading block address in the spare area to be used next is an NAP, in a case where recording processing is performed using the medium whose spare area contains blocks with "SPR entries with status 2=0100", a method of determining the NAP does not show a block address registered in the "SPR entries with status 2=0100" and can determine a block address subsequent to the registered block address as an NAP to be used next.

2. A recording/reproducing device which makes recording and reproducing using a rewritable medium having a user data area, a spare area, and a management information storage area that is updated at least when the spare area is in use, said recording/reproducing device comprising at least:
a medium discerning means which discerns the medium loaded in the medium recording/reproducing device;
format processing means which physically formats the medium;
replacement process means which performs the replacement process by using the spare area;
DFL entry searching means capable of judging and searching for DFL (defect list) entry information indicating defect type information about each block, the DFL entry information being stored in the management information storage area;
replacement process means A which uses a leading block address NAP (next available PSN) to be used as means which manages a block within the spare area to be used next and which performs management in such a way that a method of determining the NAP does not show a block address registered as an "unusable entry" indicative of blocks for future replacement process and determines a block address subsequent to the registered block address as an NAP to be used next;
replacement process control means B which registers blocks capable of being used for future replacement processing during format processing as "SPR entry with status 2=0000" and performs management using the "SPR entry with status 2=0000"; and
replacement process switching means which selects one of the replacement process control means A and the replacement process control means B according to results of the discernment of the medium provided by the medium discerning means.

3. A method of making reproducing using a rewritable medium having a user data area, a spare area, and a management information storage area which stores information used by the spare area,
wherein DFL entry information indicating defect type information about each block is stored at least in the management information storage area,
wherein if blocks in the spare area are judged as unusable as spare blocks during future replacement processing when format processing or replacement process is performed, the first-mentioned blocks can be registered as "unusable entries" in the DFL and, if the first-mentioned blocks were judged as defective blocks in the past and might be usable for future replacement processing, the first-mentioned blocks can be registered as "SPR (spare) entries with status 2=0100" in the DFL, and
wherein assuming that a leading block address in the spare area to be used next is an NAP, in a case where recording processing is performed using the medium whose spare area contains blocks with "SPR entries with status 2=0100", the medium having the DFL registered thereon is reproduced according to the DFL in accordance with a recording method capable of determining the NAP which does not show a block address registered in the "SPR entries with status 2=0100" and can determine a block address subsequent to the registered block address as an NAP to be used next.

4. A rewritable medium comprising:
a user data area;
a spare area; and a management information storage area which stores DFL entry information indicating defect type information about each block;

wherein, if blocks in the spare area are judged as unusable as spare blocks during future replacement processing when format processing or replacement process is performed, the first-mentioned blocks can be registered as "unusable entries" in the DFL and, if the first-mentioned blocks were judged as defective blocks and might be usable for future replacement processing, the first-mentioned blocks can be registered as "SPR (spare) entries with status 2=0100" in the DFL; and wherein assuming that a leading block address in the spare area to be used next is an NAP, in a case where recording processing is performed using the medium whose spare area contains blocks with the "SPR entries with status 2=0100", the DFL entry information is managed by a method capable of determining the NAP which does not show a block address registered in the "SPR entries with status 2=0100" and can determine a block address subsequent to the registered block address as an NAP to be used next.

* * * * *